March 9, 1943. H. WALTHER 2,313,410
PREPARATION OF BORON COMPOSITIONS
Filed March 31, 1939
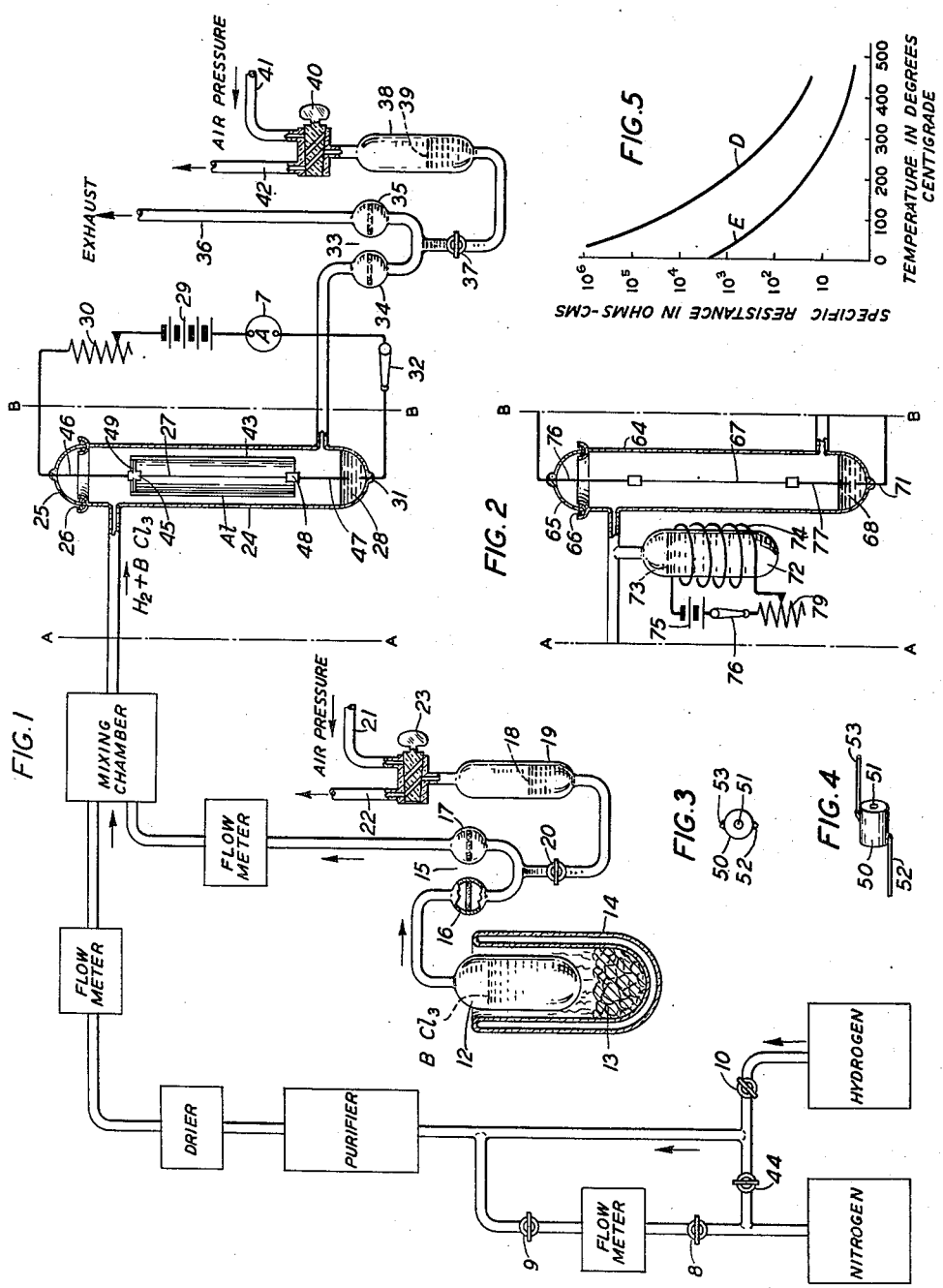
INVENTOR
H. WALTHER
BY
B. H. Jackson
ATTORNEY Patented Mar. 9, 1943

2,313,410

UNITED STATES PATENT OFFICE 2,313,410

PREPARATION OF BORON COMPOSITIONS

Henry Walther, Millburn, N. J., assignor to Bell Telephone Laboratories, Incorporated, New York, N. Y., a corporation of New York Application March 31, 1939, Serial No. 265,183

14 Claims. (Cl. 117—107)

This invention relates to the preparation of resistor elements which have a negative temperature coefficient of resistance and more particularly to the preparation of boron thermistors.

An object of this invention is to modify a mass of boron to change the characteristics thereof for rendering it suitable for use as a thermistor.

Another object of this invention is to incorporate throughout a mass of boron homogeneously another element.

A more particular object of this invention is to prepare simultaneously boron and another element to produce a homogeneous substance adapted for use as a thermistor.

Boron has an exceptionally high negative temperature coefficient of resistance. The conductivity of pure boron doubles for a 17° C. temperature rise in the range from zero to 100° C. This property is of special value in electrical systems in which temperature control devices are required. However, the resistivity of pure boron is too high to be of practical use for this purpose. The resistivity of a boron unit employed as a thermistor may be materially lowered by incorporating with it a small quantity of another element, such as aluminum. While boron with certain amounts of other elements, such as magnesium, or aluminum, or both, has been heretofore prepared, the resulting product is heterogeneous. The grain size of such products ranges from relatively large crystals to a fine powder and the crystals are extremely irregular.

In accordance with this invention, small quantities of metals or silicon or nitrogen are introduced into boron to form a homogeneous mass which is admirably adapted for use as thermistors. The grain size and crystals of the product resulting from the practice of this invention are uniform. The metal or silicon or nitrogen is introduced when the boron is formed by the interaction of boron halide and a reducing agent when subjected to a suitable heated surface. Preferably, the metal if it is above hydrogen in the electrochemical series is disposed in the form of a shield around a heated surface comprising a heated filament of tungsten. A boron halide, such as boron trichloride, and a reducing material, such as hydrogen or carbon monoxide, are then passed over the heated filament. The reducing material interacts with the boron trichloride or other halide of boron to form boron and hydrochloric or hydrohalogen acid. The boron is deposited on the filament. The halogenated product, such as hydrochloric acid, reacts with the metal to form a halide thereof. The metallic halide combines with the hydrogen in the proximity of the filament to deposit the metal thereon simultaneously with the formation of the boron. The resulting product is homogeneous and the filament upon which the boron and metal is deposited serves as a convenient guide for securing a required length of resistance unit. Alternatively, other metals or silicon or nitrogen may be incorporated with the boron by subjecting boron trichloride, a reducing medium and elemental nitrogen or a vaporized compound of the metal or silicon, such as a metallic halide or silicon tetrachloride, to a heated surface such as an incandescent filament. The boron and metal or silicon or nitrogen is deposited on the filament simultaneously to form a homogeneous unit.

A more comprehensive understanding of this invention is obtained by reference to the accompanying drawing, in which:

Fig. 1 shows diagrammatically apparatus which may be employed in the method of incorporating a metal with boron by the use of the elemental metal;

Fig. 2 represents portions of apparatus which may be used in a modification of the method, apparatus for which is shown in Fig. 1;

Figs. 3 and 4 are views of a thermistor produced by the method of this invention; and Fig. 5 is a graphic representation of the temperature-resistance characteristics of the thermistors shown in Figs. 3 and 4.

In the apparatus of Fig. 1 a supply of a reducing medium such as hydrogen is indicated by the block labeled "Hydrogen." The hydrogen passes through a stop-cock 10 to a means for freeing the hydrogen from any contaminating materials, such as oxygen. This means is represented by the block labeled "Purifier" and may comprise heated capper gauze. From the purifier the hydrogen passes to a drier comprising, for example, phosphorus pentoxide or other efficient dehydrating agent. The hydrogen then passes through a flow meter to a mixing chamber.

A boron halide such as boron trichloride is contained in a flask 12 which is cooled by solid carbon dioxide 13 in a Dewar flask 14. From the flask 12 the boron trichloride passes through a mercury valve 15 containing two fritted glass filters 16 and 17 and thence through a flow meter to the mixing chamber. The fritted glass filters 16 and 17 are fused in the valve 15. The pores of these filters are so fine that mercury at vacuum or at a pressure even in excess of one atmosphere cannot pass through, while gases readily pass. A convenient fluid for the flow meter in the hydrogen line is alpha monobromonaphthalene. In the boron trichloride line no such organic liquid may be employed since the boron trichloride reacts with these materials. Mercury is employed in the flow meter of the boron trichloride line and is also employed in the valve 15. The valve 15 is supplied with mercury 18 contained in a reservoir 19 through a stop-cock 20 to control the flow of boron trichloride to the mixing chamber.

To effectuate this control, a three-way stop-cock 23 is connected to the reservoir 19 to control the pressure on the mercury by means of air pressure supplied through a tube 21 from a source not shown, or to reduce the pressure thereon to that of the atmosphere through a tube 22. When it is desired to stop the flow of boron trichloride to the mixing chamber the stop-cock 20 is opened to permit the mercury from the reservoir 19 to flow into the two arms of the valve 15. The stop-cock 23 is opened to allow air pressure to be applied to the mercury 18 in the reservoir 19. Under these conditions the mercury is forced up the two arms of the valve 15 to the height of that of the glass filters 16 and 17. When it is desired that the boron trichloride be passed to the mixing chamber, the air pressure is removed and the pressure exerted on the mercury 18 reduced to atmospheric by turning the stop-cock 23 to connect the reservoir 19 to the tube 22. When this condition prevails, the mercury in the arms of the valve 15 flows back to a point below the junction of the two arms. Preferably, the boron trichloride in the flask 12 is free of chlorine. While chlorine does not constitute a harmful impurity from the standpoint of the boron to be deposited, its presence contaminates the mercury and may render the mercury seal valve 15 inoperative.

The boron trichloride may be purified by shaking it with mercury for a relatively short period of time. From the mixing chamber the hydrogen and boron trichloride pass to a deposit chamber 24. The chamber 24 is sealed by means of a cover 25 and mercury 26 contained in a suitable recess in the tube 24. A lead wire 46, preferably comprising a heavy tungsten rod, passes through the cover 25 connected to a receptacle 45 for holding one end of a tungsten filament 27. The other end of the tungsten filament 27 is connected to another lead 47, preferably a heavy tungsten rod, by means of a chuck 48. The lead 47 is in contact with a pool of mercury 28 contained in the bottom of the tube 24. A source of current 29 supplies electrical energy to the filament 27 from one pole through a variable resistance 30, lead 46, filament 27, lead 47, mercury pool 28, a lead 31 connected to the pool of mercury, a switch 32, an ammeter 7 to the other pole of the source 29.

If it is desired to incorporate a metal in the boron which is higher in the electrochemical series than that of hydrogen, it is advantageous to provide a semicircular shell 43 of the metal enclosing the filament 27. The shell is advantageously spaced from ⅛ inch to one inch from the filament by means of a disc 49 attached to the receptacle 45. From the chamber 24 any resulting gases pass through a mercury valve 33, similar to the valve 15 and containing fritted glass filters 34 and 35, to the atmosphere through a tube 36. The valve 33 operates in a similar manner to the valve 15, heretofore described, and is connected through a stop-cock 37 to a reservoir 38 containing mercury 39. A three-way stop-cock 40 associated with the reservoir 38 is capable of applying pressure to the mercury by means of air through a line 41 or reducing the pressure thereof by connection to the atmosphere through line 42.

A source of nitrogen gas may be employed for flushing the apparatus. In the illustrated apparatus the nitrogen passes through a stop-cock 44 through the purifier, drier, flow meter to the mixing chamber and thence through the deposit chamber 24, valve 33 to the exhaust tube 36. After the apparatus has been flushed, it is desirable to remove the nitrogen in the system before heating the filament 27, since the nitrogen would combine with the boron deposited on the filament. Accordingly the nitrogen is turned off by means of a stop-cock 44 and hydrogen passed through the system until the system is entirely freed of nitrogen.

If the shell 43 be of aluminum, for example, the hydrochloric acid resulting from the interaction of boron trichloride and hydrogen reacts with the aluminum to form aluminum chloride. This aluminum chloride in turn is decomposed to form aluminum as a result of the interaction of aluminum chloride with the hydrogen present. When boron trichloride and hydrogen pass over a heated surface such as hot tungsten filament the reaction is

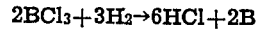
$$2BCl_3 + 3H_2 \rightarrow 6HCl + 2B$$

To deposit boron on the tungsten filament the temperature of the filament is preferably maintained between 800° C. and 1500° C. Toward either end of this temperature range the time rate of deposit decreases, at the lower end due to slow chemical reaction and at the higher end due to excessive evaporation. The most suitable temperature was found to be approximately 1300° C.

In the event that the hydrogen is not freed from all traces of oxygen and moisture, the oxygen would tend to oxidize and eventually destroy the tungsten filament. The moisture resulting from the reaction of the hydrogen and such oxygen also gives rise to the reaction

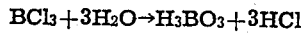
$$BCl_3 + 3H_2O \rightarrow H_3BO_3 + 3HCl$$

The boric acid formed in this reaction condenses on the walls of the deposit chamber 24 and prevents visual observation of the filament.

The hydrochloric acid formed in the interaction of boron chloride and hydrogen reacts with the shell of the metal to form a chloride thereof. If the shell be of aluminum the following reaction occurs:

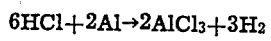
$$6HCl + 2Al \rightarrow 2AlCl_3 + 3H_2$$

The metallic halide, such as aluminum chloride, formed at the shell, evaporates and is decomposed again at the filament, permitting the metal, such as aluminum, to be formed with the boron on the filament. The amount of aluminum incorporated with the boron deposited on the filament may be varied by changing the distance between the filament and the exposed metallic surface.

Alternatively, the filament 27 may be enclosed in a cylinder comprising wire cloth of the metal desired to be incorporated with the boron. For example, aluminum wire cloth may be formed in a circle to surround the filament 27, or powdered aluminum may be sprinkled on a mesh of copper or other metal below hydrogen in the electrochemical series. However, the semicircular metallic shield is preferred. The flow of gases through the reaction chamber and the generation of convection currents within the chamber are often troublesome in the use of the wire cloth construction since they tend to prevent uniform temperature along the vertically situated filament. Uneven temperature results in a non-uniform deposit of boron along the filament. The metallic shield remedies this condition and boron resistance units prepared from different parts of the filament when the shield is employed cannot be distinguished from one another.

The tungsten filament 27 may be .004 inch in diameter and approximately 6½ inches long, suspended under a slight tension with the lower mounting of rod 47 dipping into the mercury pool 28. The tension for a given length of filament is adjusted to prevent excessive transverse vibration of the filament which occurs when the fundamental frequency of this vibrating string coincides more or less with existing building vibrations or harmonics of them. The stiffness of the filament changes as the size of the deposit thereon increases, thereby changing its resonant frequency.

For the preparation of boron resistors containing a small quantity of aluminum the semi-circular shell 43 may be $\frac{1}{32}$ inch thick and rolled into a semicircle of ½ inch inside diameter. The filament is situated at the center of the semicircle. The deposit chamber 24 may be a glass vessel measuring 1¼ inches inside diameter and 12 inches long. The flow meter in the hydrogen and boron trichloride lines may be of well-known construction, measuring the pressure difference across the ends of a capillary tube. The flow of hydrogen employed in apparatus of the type illustrated may be about 5 cubic centimeters per minute and that of boron trichloride about $\frac{1}{10}$ of that amount. The rate of gas flow of either the boron trichloride or the hydrogen is not especially critical since an excess of each is needed. The required time of deposit with the temperature of the filament at about 1300° C. is about 1¼ hours. The resulting yield on the tungsten filament is a rod of about .030 inch diameter of boron including aluminum or other metal. During the deposit, constant temperature is advantageously maintained by gradually increasing the applied voltage as the filament increases in diameter. The finished rod of boron and the other element is removed from the deposit chamber 24, reheated in air between 600° C. to 1000° C. and then quenched in water. Preferably the rod is reheated to approximately 800° C. This treatment materially decreases the brittleness of the material. For use as thermistors the rod is preferably broken into small cylinders of about .040 inch long which, for this material, is the approximate length necessary to produce resistance units for most circuit requirements.

If it is desired to combine nitrogen with boron, elemental nitrogen is passed over the heated filament with the boron halide and the reducing medium. To accomplish this combination in the apparatus shown in Fig. 1, no shell 43 is used and nitrogen is passed through a stop-cock 8, a flow meter, a stop-cock 9 to the purifier. From the purifier, both the reducing agent such as hydrogen and the nitrogen pass through the drier and flow meter to the mixing chamber. Here the hydrogen and nitrogen are mixed with the boron halide, such as boron trichloride, to react in the chamber 24 to deposit a material comprising boron and a compound of boron and nitrogen on the filament 27. The hydrogen reacts with the boron trichloride to form elemental boron and hydrogen chloride, while the nitrogen combines with the boron to form a compound of these elements.

Figs. 3 and 4 show a resistance unit prepared in the manner heretofore described. The unit comprises, preferably, a deposit 50 comprising boron and another element on a core of tungsten 51. Platinum leads 52 and 53 are attached to the deposit 50 in a manner described in Patent 2,184,847 of G. L. Pearson, issued December 26, 1939. The presence of a small amount of aluminum incorporated in the boron in accordance with this invention reduces the specific resistance to about 1000 ohms-centimeters as compared with about $10^6$ ohms-centimeters for pure boron. The resistance of pure boron at room temperature is reduced by a factor of two for a temperature increase of 17° C., while the deposited boron containing aluminum requires 29° C. increase for the same change in resistance.

The specific resistance agains temperature curve for a pure boron and that containing aluminum is shown in Fig. 5. Curve D represents the temperature-resistance characteristic of pure boron, while curve E shows that of a resistor unit comprising boron and a small amount of aluminum prepared in accordance with this invention. It is observed that the specific resistance of the deposit containing aluminum is considerably below that of pure boron.

In Fig. 2 portions of apparatus employed in an alternate method of preparing boron containing small quantities or silicon is shown. Any metal whether or not above hydrogen in the electrochemical series may be incorporated by the apparatus shown in Fig. 2. The alternate form of apparatus illustrated in Fig. 2 is a portion of the system shown between the lines A—A and B—B in Fig. 1. From the mixing chamber the hydrogen and boron trichloride pass to a deposit chamber 64. A cover 65 through which a lead 76 passes encloses the deposit chamber 64 and the cover 65 is sealed to the deposit chamber 64 by means of a pool of mercury 66 contained in a recession of the chamber 64. A filament 67 is connected at one end to the lead 76 and at the other end to a lead 77. The lead 77 is immersed in a pool of mercury 68 in electrical contact with a lead 71. The filament 67 is heated in the same manner as the filament 27 of Fig. 1. The hydrogen and boron trichloride are intermixed with a volatile compound of either the metal or silicon to be incorporated with the boron such as the metallic or silicon halide. The metallic or silicon halide 73 is contained in a flask 72 which is heated if necessary by a helical coil 74 supplied with current from a source 75 through a switch 76 and variable resistance 79. The metallic or silicon halide reacts with the hydrogen to form the metal or silicon and hydrohalogen acid in accordance with the following typical equation:

$$2AlCl_3 + 3H_2 \rightarrow 6HCl + 2Al$$

The metal or silicon is deposited on the filament 67 in the same manner as that described for the apparatus shown in Fig. 1.

Various metals may be employed for modifying the characteristics of boron to reduce materially the resistance thereof. For example, lithium, sodium, potassium, copper, silver, gold, calcium, strontium, barium, zinc, cadmium, aluminum, titanium, zirconium, tin, vanadium, arsenic, antimony, bismuth, chromium, molybdenum, magnesium, iron, cobalt, nickel, platinum, may be used for this purpose. The halides or other non-oxidizing compounds, such as carbonyls of these metals, or silicon, may be employed as described in the method illustrated by the apparatus shown in Fig. 2; or the metals themselves if above hydrogen in the electrochemical series, may be used in the form of a semi-circular shell as heretofore described to effect their incorporation uniformly throughout a mass of boron. After deposit the mass may be heated between 600° to 1000° C. and subsequently quenched in water. While boron trichloride has been used in the specific embodiments of this invention, other boron halides such as boron tribromide or boron tri-iodide may be used to produce the thermistor.

While preferred embodiments of this invention have been illustrated and described, various modifications may be made therein without departing from the scope of the appended claims.

What is claimed is:

1. The method of preparing a composition including boron and a metal above hydrogen in the electrochemical series, which comprises subjecting boron halide and a reducing medium to a body having a heated surface maintained between 800° C. to 1500° C. in the presence of a body of said metal, which body is spaced from said body having a heated surface and is unheated except for heat supplied by said heated surface, but which has a surface disposed in such proximity to said heated surface that metal deposits from said body of metal on said heated surface with boron, heating the resulting product to approximately 600° C. to 1000° C., and quenching it in a liquid.

2. The method of preparing a composition including boron and aluminum which comprises passing a boron halide and hydrogen over a tungsten filament heated to approximately 1300° C. in proximity to an aluminum shell, semicircular in form, heating the resulting product to approximately 800° C., and quenching it in water.

3. The method of preparing a composition including boron and a metal which comprises exposing boron halide and a reducing agent, in an atmosphere free of oxygen, to a body having a heated surface, which body has spaced therefrom a body of said metal which is unheated except for heat supplied from said heated surface and which has a surface in such proximity to said heated surface that metal from said body of metal is deposited with boron on said heated surface.

4. The method of preparing a composition including boron and a metal which forms a volatile halide upon exposure to a hydrohalogen acid in the presence of mild heat which comprises exposing boron halide and hydrogen, in an atmosphere free of oxygen, to a body having a heated surface, which body has spaced therefrom a body of said metal which is unheated except for heat supplied from said heated surface and which has a surface in such proximity to said heated surface that metal from said body of metal is deposited with boron on said heated surface.

5. The method of preparing a composition including boron and a metal above hydrogen in the electrochemical series which comprises exposing boron halide and a reducing agent, in an atmosphere free of oxygen, to a body having a heated surface, which body has spaced therefrom a body of said metal which is unheated except for heat supplied from said heated surface and which has a surface in such proximity to said heated surface that metal from said body of metal is deposited with boron on said heated surface.

6. The method of preparing a composition including boron and a metal above hydrogen in the electrochemical series which comprises exposing boron halide and hydrogen, in an atmosphere free of oxygen, to a body having a heated surface, which body has spaced therefrom a body of said metal which is unheated except for heat supplied from said heated surface and which has a surface in such proximity to said heated surface that metal from said body of metal is deposited with boron on said heated surface.

7. The method of preparing a composition including boron and a metal above hydrogen in the electrochemical series which comprises exposing boron halide and a reducing agent, in an atmosphere free of oxygen, to a heated tungsten filament having spaced therefrom a body of said metal which is unheated except for heat supplied from said filament and which has a surface disposed in such proximity to said filament that metal from said body is deposited with boron on said filament.

8. The method of preparing a composition including boron and aluminum which comprises exposing boron halide and hydrogen, in an atmosphere free of oxygen, to a body having a heated surface, which body has spaced therefrom a body of aluminum which is unheated except for heat supplied from said heated surface and which has a surface in such proximity to said heated surface that aluminum from said body is deposited with boron on said heated surface.

9. The method of preparing a composition including boron and a metal above hydrogen in the electrochemical series which comprises exposing boron halide and a reducing agent, in an atmosphere free of oxygen, to a heated filament which is at least partly surrounded by and has extending lengthwise thereof a body of metal having a substantially cylindrical interior surface which is spaced from but in such proximity to said filament that metal from said body is deposited with boron on said filament.

10. The method of preparing a composition including boron and aluminum which comprises passing boron halide and hydrogen over a tungsten filament, heated between 800° C. and 1500° C., which is at least partly surrounded by and has extending lengthwise thereof a body of aluminum having a substantially cylindrical interior surface which is spaced from but in such proximity to said filament that aluminum from said body is deposited with the boron on said filament.

11. The method of preparing a composition including boron and aluminum which comprises passing boron trichloride and hydrogen over a tungsten filament, heated between 800° C. and 1500° C., and which is disposed at the focus of a semicircular cylinder of sheet aluminum which extends lengthwise of the filament and is mounted in such proximity to said filament that aluminum from said cylinder is deposited on said filament with boron.

12. The method of preparing a composition including boron and a metal which comprises exposing a boron halide and a gaseous reducing agent to a body having a surface at an elevated temperature sufficient to reduce the boron halide and to a body of said metal having adjacent said heated surface a surface which is at a temperature below that which will reduce said boron halide and which surface is in such proximity to said heated surface that metal from said body of metal is deposited with boron on said heated surface.

13. The method of preparing a composition including boron and a metal which forms a volatile halide upon exposure to a hydrohalogen acid in the presence of mild heating which comprises exposing a boron halide and a gaseous reducing agent to a body having a surface at an elevated temperature sufficient to reduce the boron halide and to a body of said metal having adjacent said heated surface a surface which is at a temperatur below that which will reduce said boron halide and which surface is in such proximity to said heated surface that metal from said body of metal is deposited with boron on said heated surface.

14. The method of preparing a composition including a boron and a metal above hydrogen in the electrochemical series which comprises exposing a boron halide and a gaseous reducing agent to a body having a surface at an elevated temperature sufficient to reduce the boron halide and to a body of said metal having adjacent said heated surface a surface which is at a temperature below that which will reduce said boron halide and which surface is in such proximity to said heated surface that metal from said body of metal is deposited with boron on said heated surface.

HENRY WALTHER.